United States Patent
Welke et al.

(10) Patent No.: US 7,109,627 B2
(45) Date of Patent: Sep. 19, 2006

(54) ROTOR FOR AN ELECTRICAL MACHINE

(75) Inventors: Knut Welke, Sulzheim (DE); Khalid Jafoui, Viereth-Trunstadt (DE); Ulrich Klawe, Schweinfurt (DE); Astrid Pümmler, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/006,401

(22) Filed: Dec. 7, 2004

(65) Prior Publication Data
US 2005/0127768 A1 Jun. 16, 2005

(30) Foreign Application Priority Data
Dec. 13, 2003 (DE) ................. 103 58 456

(51) Int. Cl.
*H02K 1/12* (2006.01)
*H02K 21/12* (2006.01)
(52) U.S. Cl. .............. 310/217; 310/89; 310/156.26; 310/156.28; 310/156.29
(58) Field of Classification Search .......... 310/67 R, 310/156.08, 156.12–156.14, 156.26, 156.28, 310/156.29, 261, 89, 44, 217
See application file for complete search history.

(56) References Cited

U.S. PATENT DOCUMENTS

| 3,663,850 | A | * | 5/1972 | Phelon ................. 310/153 |
| 4,739,427 | A | * | 4/1988 | Kilmer et al. ........ 360/98.07 |
| 5,659,216 | A | * | 8/1997 | Bisantz ............... 310/156.26 |
| 5,757,101 | A | * | 5/1998 | Boutaghou et al. ...... 310/261 |
| 6,049,930 | A | * | 4/2000 | Hisano et al. ............. 8/159 |
| 6,093,984 | A | * | 7/2000 | Shiga et al. ............. 310/26 |

FOREIGN PATENT DOCUMENTS

JP   4-05056620 A * 3/1993 .............. 310/67 R

* cited by examiner

*Primary Examiner*—Tran Nguyen
(74) *Attorney, Agent, or Firm*—Cohen, Pontani, Lieberman & Pavane

(57) ABSTRACT

A rotor for an electrical machine includes a rotor carrier of metallic material with a back wall extending radially to the axis of rotation of the electrical machine and a tubular section extending in the axial direction, in which a laminated core is installed. The rotor carrier is designed as a single, flow-formed part with axially extending ribs which engage in grooves on the laminated core.

16 Claims, 4 Drawing Sheets

Fig. 4
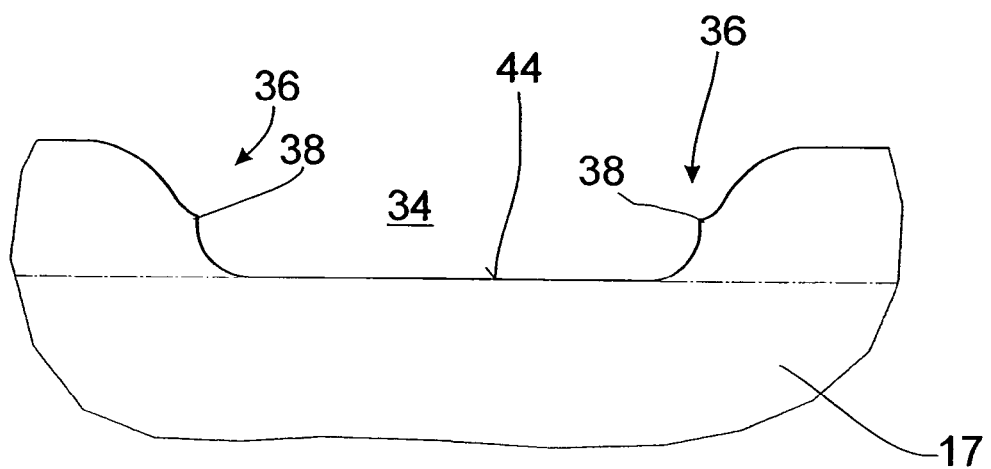
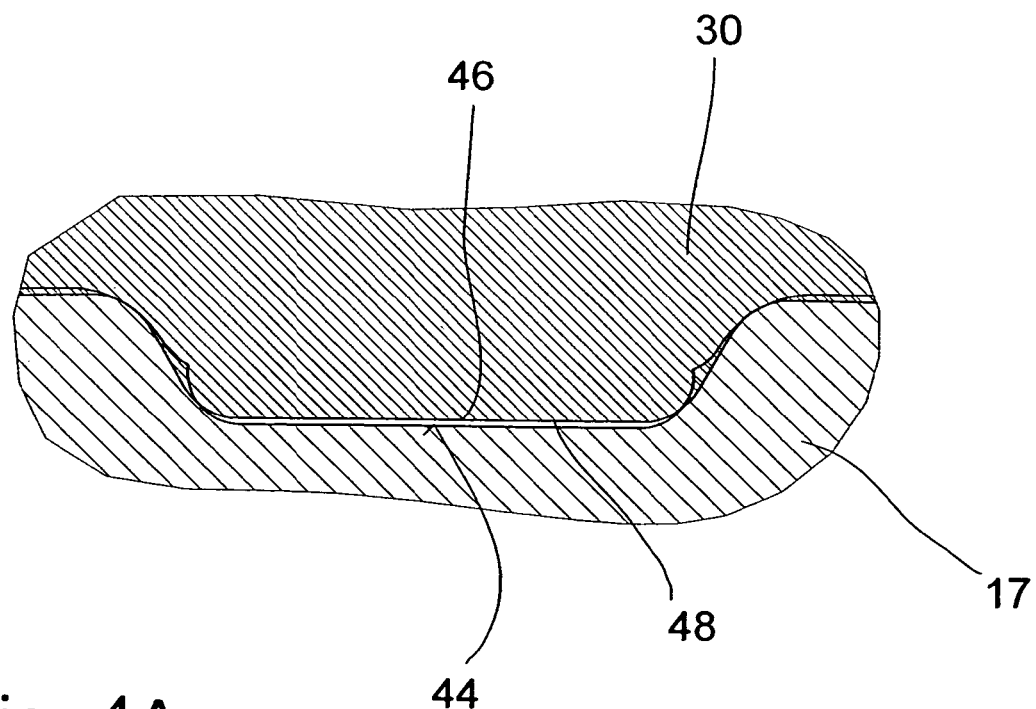
Fig. 4A

ROTOR FOR AN ELECTRICAL MACHINE

BACKGROUND OF THE INVENTION

1. Field of the Invention

The invention pertains to a rotor for an electrical machine, including a rotor carrier of metallic material with a radially extending back wall and a tubular section extending axially from the back wall, in which a laminated core is installed.

2. Description of the Related Art

Electrical machines are generally known. They comprise a rotor, which rotates around a shaft, and a stator, which is stationary with respect to the rotor. The electrical machine can be, for example, a motor, a generator, or a motor-generator. The latter type of machine is used to an increasing extent in motor vehicle technology to combine previously separate functions or systems, namely, the generator which produces the electrical power for the on-board vehicle electrical system and the starter which starts the internal combustion engine, into a single system. Current developments in the automotive industry demand in general that increasing the comfort of the ride should not lead to any increase—or certainly not to any excessive increase—in the weight of the vehicle and should in fact be associated with a decrease in its weight. The starter-generator has already provided a weight advantage in this context, and efforts are continuing to achieve an even greater weight reduction in this area.

The laminated core of a rotor, which guides a magnetic flux to produce a torque, can be mounted directly on the rotor shaft, for example, or it can be mounted indirectly on the shaft of the electrical machine by means of a rotor carrier and possibly a hub, as is the case with external rotor machines. According to a known process, the rotor carrier is a single part formed by cutting operations out of a solid piece of material such as a cylinder of aluminum or steel. It is also known as an alternative that a circular blank can be welded to a section of tubing to form a rotor carrier. The known processes suffer from the disadvantage that they are too material-intensive and require a great deal of labor, as a result of which their production costs are high.

SUMMARY OF THE INVENTION

The invention is based on the task of providing a rotor for an electrical machine which can be fabricated more easily, weighs less, and costs less to produce.

The task is accomplished by a rotor which is formed in one piece by flow-forming.

As a result of the design of the rotor carrier as a flow-formed part, its weight can be significantly reduced, and it can still be provided with great structural strength at the same time. There is therefore no need for expensive finishing work, which again contributes to the lowering of costs.

In the process of flow-forming, a rotational symmetrical blank is usually mounted on a flow-forming mandrel in a fixed axial position and then spun. The material is plastically deformed by rolls, which exert pressure locally on the circumference of the blank in the radial and axial directions. The external contour of the rotor carrier is determined by the radial movements of the rolls. The internal contour of the rotor carrier to be produced is determined directly by the shape of the flow-forming mandrel.

According to the preferred embodiments, the rotor carrier can also be fabricated with a variable wall thickness, and both the internal and external contours as well as ribbing can be produced without the need for cutting operations. The surface quality is extremely high at the same time.

The invention is explained below by way of example on the basis of an external rotor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2A is a section view showing the rolled, ring-shaped collar;

FIG. 3A is an enlarged section of the core showing a magnet;

FIG. 4 is an enlarged section view of a laminated core; and

FIG. 4A is a section view of a laminated core connected to a rotor carrier.

DETAILED DESCRIPTION OF THE PRESENTLY PREFERRED EMBODIMENTS

Figure 1:
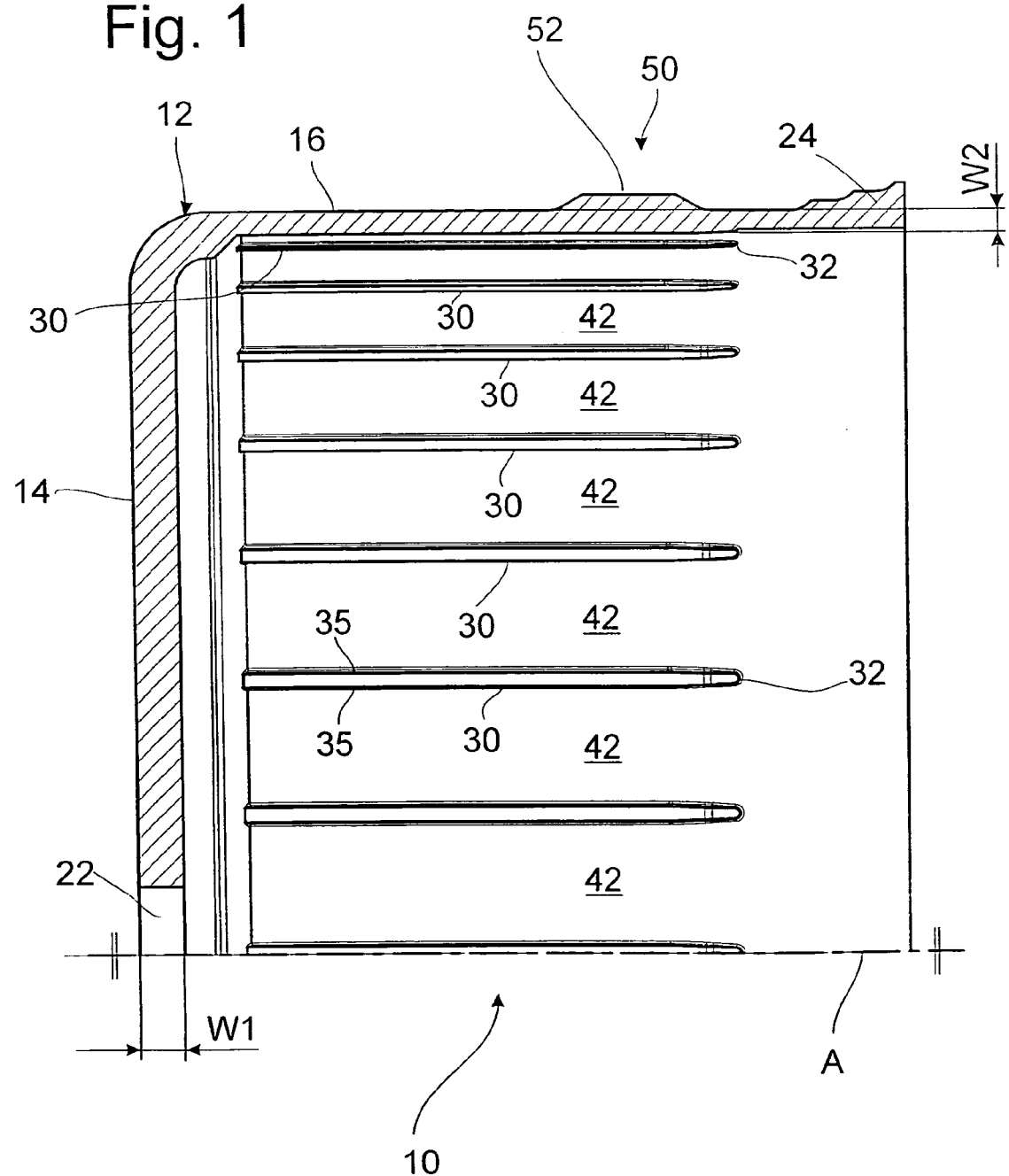
FIG. 1 shows an axial section through a rotor carrier designed as a single, flow-formed part for use in an electrical machine.
Figure 2:
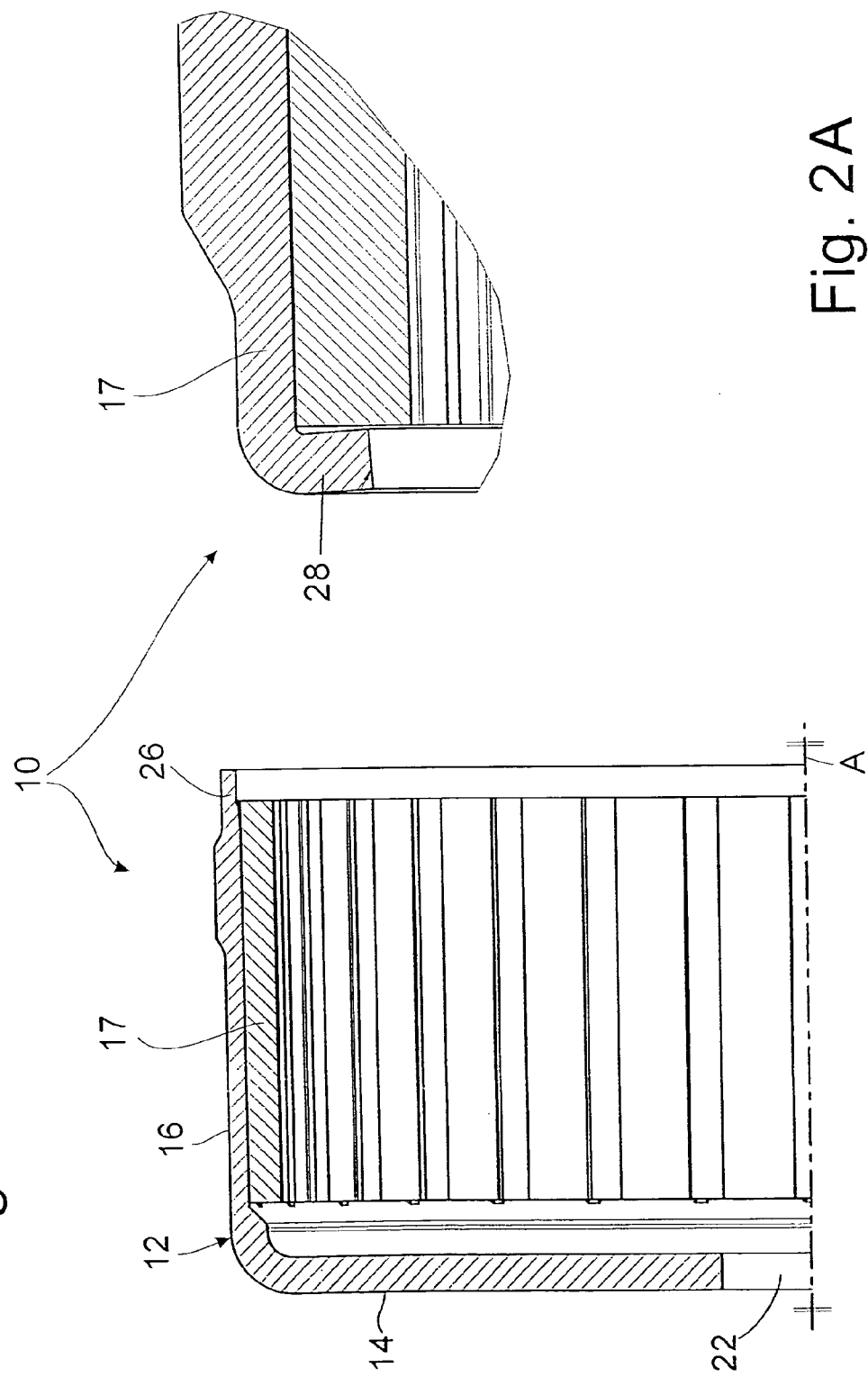
FIG. 2 shows a rotor carrier with a laminated core.
Figure 3:
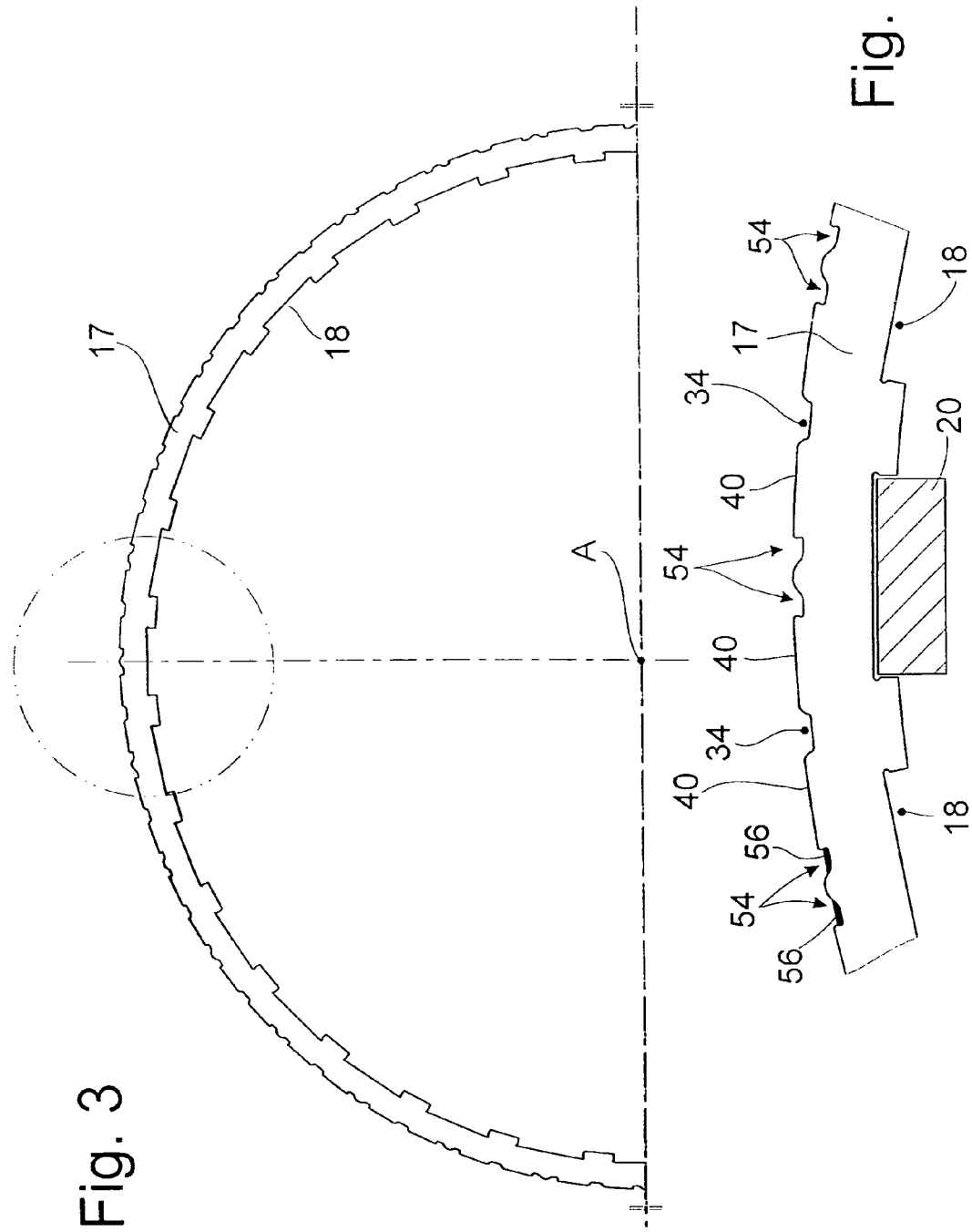
FIG. 3 is an end view of half a laminated core provided with a grooved structure.

The figures show a rotor 10 for a permanently excited external rotor electrical machine (not shown). The rotor 10 comprises a rotor carrier 12, which is fabricated as a single, flow-formed part out of a piece of metal material, e.g., high-quality steel or aluminum. The rotor carrier has a back wall 14, which extends radially to the axis of rotation A of the electrical machine. This back wall continues as a tubular section 16, which extends in the axial direction. Overall, therefore, the rotor 10 has a cup-shaped form, and its interior space holds a laminated core 17, prefabricated of electric sheets by edge rolling. On its internal circumferential surface, the core carries a plurality of permanent magnets 20 in grooves 18. Only a single magnet 20 is shown in FIG. 3A. The magnetic field of the permanent magnets 20 interacts with the magnetic field of the stator (not shown) of the electrical machine and thus causes the rotor 10 to turn. It can be seen from the figures that the wall thickness W1 of the rotor back wall 14 exceeds the wall thickness W2 of the tubular section 16. For a rotor diameter in the range of approximately 250–500 mm, therefore, the rotor back wall 14 can be provided with a wall thickness W1 of approximately 3–10 mm, and the tubular section 16 can be provided with a wall thickness W2 of approximately 2–5 mm. In the radially inner area of the back wall 14, an opening 22 is formed, which can accept a rotor hub (not shown) with a shaft or, for example, a screw bolt for attachment to a shaft. The area of the rotor section 16 facing away from the back wall 14 has, as shown in FIG. 1, a flow-formed outer area 24, which is removed after the flow-forming operation. After the installation of the laminated core 17, as shown in FIG. 2, the residual axial overhang 26 is rolled over radially toward the inside to form a ring-shaped collar 28, as shown in FIG. 2A, which secures the laminated core 17 in its axial position.

On the inner circumferential surface of the tubular section 16, there are several uniformly distributed axial ribs 30, projecting radially inward from the tubular section. These ribs are provided with pilot bevels 32, which engage with corresponding axial grooves 34 formed in the outer circumferential surface of the laminated core 17. The internal contour of the tubular section 16 is produced during flow-forming by the plastic molding of the material against the external profile of the mandrel.

So that torque can be transmitted without play between the laminated core 17 and the rotor carrier 12, the axial grooves 34 in the laminated core 17 have side walls 36 with an area 38 which is oversized with respect to the web side walls 35 of the rotor carrier 12. When the laminated core 17 is inserted into the rotor carrier 12, this oversized area is plastically molded into the free spaces provided for it to form a positive connection, which makes it possible for the force to be transmitted with precision in the circumferential direction. The laminated core 17 can be inserted axially under pressure into the rotor carrier 12, or preferably it can be pushed into a rotor carrier 12 which has been heated to high temperature. As it cools and loses volume, the carrier shrinks onto the laminated core 17. The mutual centering of the rotor carrier 12 and the laminated core 17 can also be accomplished by means of the axial grooves 34 and the ribs 30. As an alternative, it is also possible to provide centering means which are separate from the torque-transmitting means. In the present case, the centering is accomplished by way of the outer diameter areas 40 of the laminated core 17 and the circumferential surface elements 42 of the carrier which rest against them and which are formed between the ribs 30 of the tubular section 16. So that, in practice, the centering will not be overdetermined, a radial gap 48 is provided between the base 44 of the axial groove 34 and the wall area 46 of the corresponding rib 30. Within the outer circumferential surface 40, pairs of additional grooves 54 are formed in the laminated core 17, by means of which the individual layers of plates can be connected by axial welds 56.

In addition, the tubular section 16 has on its outer circumferential surface a contour 50, which is modulated in the circumferential direction so that it can be detected by a rotational position detection system which determines the rotational position of the rotor with respect to the stator and/or generally with respect to some other element which is stationary with respect to the rotor. For this purpose, an elevated ring-shaped area 52 is produced by flow-forming on the tubular section 16. A toothed structure with a reference mark for determining a defined rotational position, e.g., a 60-2 toothed structure like that used for the sensor wheel of a crankshaft sensor, can be machined in this ring. The contour 50 can, for example, be scanned by a magnetic field sensor (not shown) and processed by a control unit of the electrical machine to control the operation of the machine. The signal could also be transmitted to the control unit of an internal combustion engine. Instead of a periodic pattern such as a tooth-gap structure, it is also possible to provide a contour 50 which changes continuously around the entire circumference in the form of, for example, a wedge, which tapers continuously all the way around the circumference, the reference mark of which would be defined, for example, by the point at which the tip of the wedge meets the base. Instead of an elevated contour, it would also be possible to provide a contour by cutting away material, but this can present certain disadvantages with respect to the structural strength of the component.

The invention is not limited to the external rotor described above. That is, internal rotors can also be designed with a flow-formed rotor carrier 12 similar to the example explained above.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A rotor for an electrical machine, said rotor being rotatable about an axis of rotation and comprising:
   a rotor carrier formed as a one-piece flow-formed part of metallic material, said carrier comprising a back wall extending radially from the axis of rotation and a tubular section extending from said back wall concentrically to said axis; and
   a laminated core installed on said rotor carrier.

2. The rotor of claim 1 wherein the tubular section has a wall thickness, and the back wall has a wall thickness that is greater than the wall thickness of the tubular section.

3. The rotor of claim 1 wherein the laminated core is located radially inside the tubular section.

4. The rotor of claim 3 wherein the tubular section has an inner circumferential surface with at least one axially extending rib standing proud of said surface, said laminated core having an outer circumferential surface with at least one axially extending groove in which a respective at least one axially extending rib engages.

5. The rotor of claim 4 wherein each said groove has at least one sidewall provided with a protrusion which plastically deforms when said rib is received in said groove.

6. The rotor of claim 4 wherein each said groove has a base and each said rib has a wall area that is spaced from said base by a radial gap.

7. The rotor of claim 1 wherein the tubular section has an end remote from said back wall, said carrier further comprising a ring-shaped collar deformed to extend radially inward from said end to secure said laminated core axially in said carrier.

8. The rotor of claim 1 wherein said carrier comprises a circumferentially extending contour which can be detected by a rotational position detection system to determine a rotational position of the rotor with respect to a stationary element.

9. The rotor of claim 8 wherein the contour comprises a reference mark which represents a defined rotational position.

10. A rotor for an electrical machine, said rotor being rotatable about an axis of rotation and comprising:
    a rotor carrier formed as a one-piece flow-formed part of metallic material, said carrier comprising a back wall extending radially from the axis of rotation and a tubular section extending from said back wall concentrically to said axis, wherein the tubular section has an inner circumferential surface with at least one axially extending rib standing proud of said surface; and a laminated core located radially inside the tubular section, said laminated core having an outer circumferential surface with at least one axially extending groove in which a respective at least one axially extending rib engages.

11. The rotor of claim 10 wherein the tubular section has a wall thickness, and the back wall has a wall thickness that is greater than the wall thickness of the tubular section.

12. The rotor of claim 10 wherein each said groove has at least one sidewall provided with a protrusion which plastically deforms when said rib is received in said groove.

13. The rotor of claim 10 wherein each said groove has a base and each said rib has a wall area that is spaced from said base by a radial gap.

14. The rotor of claim 10 wherein the tubular section has an end remote from said back wall, said carrier further comprising a ring-shaped collar extending radially inward from said end to secure said laminated core axially in said carrier.

15. The rotor of claim 10 wherein said carrier comprises a circumferentially extending contour which can be detected by a rotational position detection system to determine a rotational position of the rotor with respect to a stationary element.

16. The rotor of claim 15 wherein the contour comprises a reference mark which represents a defined rotational position.

* * * * *